United States Patent [19]
Iida

[11] Patent Number: 6,037,391
[45] Date of Patent: Mar. 14, 2000

[54] WATER BASED DYE INK COMPOSITION FOR FREE INK ROLLERBALL PEN

[75] Inventor: Hisashi Iida, Yokohama, Japan

[73] Assignee: Mitsubishi Pencil Kabushiki Kaisha, Shinagawa, Tokyo, Japan

[21] Appl. No.: 09/209,107

[22] Filed: Dec. 10, 1998

[51] Int. Cl.$^7$ .................. C09D 11/16; C09D 125/04; C09D 133/08; C09D 133/10
[52] U.S. Cl. .................. 523/161; 106/31.27; 106/31.33
[58] Field of Search ..................... 523/160, 161; 106/31.27, 31.32, 31.33

[56] References Cited

U.S. PATENT DOCUMENTS

| | | |
|---|---|---|
| 4,297,260 | 10/1981 | Ferree, Jr. et al. . |
| 4,686,246 | 8/1987 | Gajra ........................................ 523/161 |
| 5,203,913 | 4/1993 | Yamamoto et al. .................... 524/560 |
| 5,389,717 | 2/1995 | Santini et al. ........................... 524/575 |
| 5,547,499 | 8/1996 | Kawasumi et al. .................. 106/31.25 |
| 5,900,445 | 5/1999 | Chandler et al. ........................ 523/161 |

FOREIGN PATENT DOCUMENTS

| | | |
|---|---|---|
| 58-176281 | 10/1983 | Japan . |
| 59-140273 | 8/1984 | Japan . |
| 60-42832 | 9/1985 | Japan . |
| 60-42833 | 9/1985 | Japan . |
| 63-256669 | 10/1988 | Japan . |
| 1-29829 | 6/1989 | Japan . |
| 5-46389 | 5/1993 | Japan . |

OTHER PUBLICATIONS

Brandrup, J. Immergut, E.H., and Grulke, E.A; Polymer Handbook, 4th Ed. John Wiley and Sons, New York (p. VI–581), 1999.

*Primary Examiner*—Vasu Jagannathan
*Assistant Examiner*—Callie Shosho
*Attorney, Agent, or Firm*—Darby & Darby

[57] ABSTRACT

A water based dye ink composition for a free ink rollerball pen characterized in that white resin particles which are insoluble in an aqueous medium and have an average particle diameter of 100 to 1000 nm and a refractive index of 1.50 or more at 20° C. are added to a water based ink composition for a writing instrument comprising a dye and an aqueous medium to thereby allow the visible color of the ink liquid to be approximate to the visible color of lines written on a sheet of white paper.

4 Claims, No Drawings

WATER BASED DYE INK COMPOSITION FOR FREE INK ROLLERBALL PEN

BACKGROUND OF THE INVENTION

1. Field of the Invention

The present invention relates to a water based ink composition for a free ink rollerball pen, more specifically to a water based ink composition for a free ink rollerball pen in which the visible color of ink liquid is almost consistent with the visible color of drawn lines in writing on a sheet of white paper by adding white resin particles insoluble in the aqueous medium to the ink composition comprising a dye and an aqueous medium.

2. Description of the Related Art

A free ink rollerball pen is of a structure in which ink is filled directly into an ink reservoir without using an ink absorber such as a fiber bundle.

A conventional water based ink composition for a free ink rollerball pen is prepared by dissolving a dye or a pigment, a rust preventive, a preservative, a lubricant, a pH controller, a drying preventive, a thickener and the like in water and a solvent, and inks further containing high molecular fine particles for various purposes are proposed. It is disclosed in Japanese Patent Application Laid-Open No. Sho 63-256669 that white, colorless or colored spherical resin particles having a particle diameter of 10 to 1000 nm which are insoluble in a liquid medium for ink and do not form a film are used in order to allow the ink to be discharged smoothly and prevent skipping of the drawn lines in writing. A water based ink for a ballpoint pen containing high molecular spherical fine particles (particle diameter: 50 to 600 nm) for the same purpose is disclosed as well in Japanese Patent Publication No. Hei 5-46389. Also, it is described in Japanese Patent Application Laid-Open No. Sho 58-176281 that a water based ink containing a styrene-butadiene latex emulsion has thixotropy and imparts gloss, luster and water resistance to drawn lines. Further, disclosed in Japanese Patent Application Laid-Open No. Sho 59-140273 is a water based ink for a ballpoint pen in which a high molecular dye prepared by combining a water-insoluble polymer having an amino group with an anionic dye or a reactive dye is used and which is improved in water resistance, intensity of the color, feathering and drying property. Also, in order to obtain an ink for ink jet recording which has a low viscosity and is capable of high intensity recording, disclosed in Japanese Patent Publication No. Sho 60-42832 is an ink in which a hydrophobic dye solution and fine particles which are of a polymer prepared by emulsion-polymerizing a vinyl monomer are dispersed in an aqueous medium, wherein the fine particles swell in a solvent for the hydrophobic dye and are insoluble and do not swell in water, and disclosed in Japanese Patent Publication No. Sho 60-42833 is an ink further containing a water-soluble dye in addition to the above ink. In these publications, the water based inks having intense colors are obtained by impregnating polymer fine particles with dyes and using dye aqueous solutions in addition thereto. Further, proposed in Japanese Patent Publication No. Hei 1-29829 is a writing medium composition in which a carboxylated styrene-butadiene latex emulsion is added. In this composition, the above latex is used as latex having weak adhesive force and no permeability to a writing surface for the purpose of erasing the lines.

Incidentally, one of the characteristics of a free ink rollerball pen is that the remaining amount and the color of the ink can be confirmed from the outside of the holder. The visible color of an ink liquid is important as a standard for judging the visible color of the drawn lines in writing on a sheet of white paper. As described above, either a pigment ink or a dye ink is used for an ink composition for a free ink rollerball pen. In the case of the pigment ink, the visible color of the ink liquid is close to that of the drawn lines in writing on a sheet of white paper. However, it is difficult in terms of dispersion stability to tone the color by mixing different kinds of pigments, so that the kind of the color is restricted.

In contrast with this, in the case of the dye ink, there is an advantage such that the color can readily be toned as compared with the pigment ink, but there is a disadvantage such that the visible color of the ink liquid is not so close to the visible color of the drawn lines in writing on a sheet of white paper, so that the color written on a sheet of paper can not definitely be confirmed from the color of the ink liquid. Accordingly, there has been a problem in that when a free ink rollerball pen is charged with a dye ink, it is difficult to know definitely the color of the ink written on a sheet of paper from the appearance. No mentions of this matter are found in the descriptions about the inks using the fine polymer particles mentioned above, and it has been desired to solve the matter. Viewing from such a standpoint, an object of the present invention is to provide a water based dye ink composition for a free ink rollerball pen in which it is made possible to allow the visible color of the ink liquid to be almost consistent with the visible color of the drawn lines in writing on a sheet of white paper when using a dye ink and in which the color can be toned in various ways.

SUMMARY OF THE INVENTION

Various investigations continued by the present inventors in order to solve the problems described above have resulted in finding that the object described above can be achieved by adding specific white resin particles to a dye ink composition and coming to complete the present invention based on this knowledge.

That is, the water based dye ink composition for a free ink rollerball pen according to the present invention is characterized in that white resin particles which are insoluble in an aqueous medium and have an average particle diameter of 100 to 1000 nm are added to a water based ink composition for a writing instrument comprising a dye and the aqueous medium to thereby allow the visible color of an ink liquid to be almost consistent with the visible color of lines written on a sheet of white paper.

Particularly, in the present invention described above, the white resin particles have preferably a refractive index of 1.50 or more at 20° C. and are preferably of emulsion or latex which has no film-forming property or has an MFT (minimum film-forming temperature) of 50° C. or higher.

Further, in the present invention described above, the white resin particles are added preferably in a proportion of 5 to 70 wt % in terms of a concentration reduced to a solid content basis.

The water based ink composition for a free ink rollerball pen according to the present invention makes it possible to definitely confirm the color of the drawn lines in writing on a sheet of white paper from the visible color of the ink liquid, and therefore the pen body becomes excellent in terms of appearance or design. In addition, the lines having no feathering can be obtained since the emulsion is added, and the composition has such excellent characteristics that an effect such as being capable of providing a smooth feeling in writing can be displayed.

DETAILED DESCRIPTION OF THE PREFERRED EMBODIMENT

The water based dye ink composition for a free ink rollerball pen according to the present invention has the largest characteristic that white resin particles which are insoluble in an aqueous medium and have an average particle diameter of 100 to 1000 nm are added to a dye ink composition comprising a dye and the aqueous medium to thereby allow the visible color of an ink liquid to be almost consistent with the visible color of lines written on a sheet of white paper. The dye ink composition comprises a dye and an aqueous medium which shall be described later, and the aqueous medium is prepared by suitably selecting, weighing and blending a lubricant, a preservative, a rust preventive, a pH controller, a drying preventive, a thickener and others in addition to water and a water-soluble organic solvent. The white resin particles added to the dye ink composition comprising such dye and aqueous medium have to be insoluble in the aqueous medium and look white by diffusing light due to a refractive index and a particle diameter thereof.

Accordingly, from such point of view, the white resin particles have desirably an average particle diameter falling in a range of 100 to 1000 nm, preferably 100 to 300 nm and a refractive index falling in a range of 1.50 or more, preferably 1.5 to 1.7 at 20° C. The average particle diameter of 100 nm or less makes the hue of the ink liquid different from that of the lines written on a paper surface and therefore is not preferred. On the other hand, the average particle diameter of 1000 nm or more cannot maintain the stability of the ink and therefore is not preferred either. The refractive index of 1.50 or less at 20° C. makes the hue of the ink liquid different from that of the lines written on a paper surface and therefore is not preferred. In the present invention, what meant by that the visible color of an ink liquid is allowed to be almost consistent with the visible color of lines drawn on a sheet of white paper is a state in which the color to be written on a sheet of paper by the ink can be confirmed from the appearance when a free ink rollerball pen is charged with the dye ink.

The white resin particles are added to the dye ink composition in a proportion falling in a range of 5 to 70 wt %, preferably 6 to 30 wt % in terms of a concentration reduced to a solid content basis, whereby the writing color to be written can definitely be confirmed from the color of the ink liquid. The proportion of 5 wt % or less in terms of a concentration reduced to a solid content basis can not allow the color to be written to be definitely confirmed. On the other hand, the proportion of 70 wt % or more in terms of a concentration reduced to a solid content basis makes the color of the dye ink less intense and makes the viscosity too high. Accordingly, such proportion is not preferred. These resin particles are blended to the dye ink composition preferably in a state dispersed in water. Usually, it is preferable to use a water-dispersing resin obtained by emulsion polymerization or suspension polymerization, which is of emulsion in which resin particles are dispersed in water and which is commercially available in the form of a plastic pigment. If the emulsion has a film-forming property, an adverse effect such as impossibility of writing due to film formation at the pen tip shall be exerted on the writing performance. Accordingly, an emulsion having no film-forming property or an MFT (minimum film-forming temperature) of 50° C. or higher is preferred. Further, the water based ink composition for a free ink rollerball pen according to the present invention has preferably a surface tension of 37.0 (mN/m) or more in order to prevent the ink from blobbing from the pen tip.

Any resins can be used as the resin for forming the white resin particles as long as they are thermoplastic resins satisfying the conditions described above. They include, for example, polyvinyl chloride, polyvinylidene chloride, polystyrene, polyethylene, polycarbonate, polymethyl methacrylate, benzoguanamine resins, polyalkyl acrylate, polyalkyl methacrylate, styrene-acrylonitrile copolymers, styrene-acrylic acid copolymers, styrene-methacrylic acid copolymers, acrylonitrile-alkyl acrylate copolymers, styrene-alkyl acrylate copolymers, styrene-alkyl methacrylate-alkylacrylate copolymers, styrene-acrylonitrile-alkyl acrylate copolymers, styrene-acrylonitrile-alkyl methacrylate-alkyl acrylate copolymers, alkyl methacrylate-alkyl acrylate copolymers, acrylic acid-methacrylic acid-alkylacrylate copolymers, and vinylidene chloride-alkyl acrylate copolymers.

Any of direct dyes, acid dyes, food dyes and basic dyes which have so far publicly been known as water-soluble dyes for a water based ink for ballpoint pen can be used for the dyes in the dye ink composition of the present invention.

Examples of the direct dyes are described below:
C. I. Direct Black 17, ditto 19, ditto 22, ditto 32, ditto 38, ditto 51 and ditto 71,
C. I. Direct Yellow 4, ditto 26, ditto 44 and ditto 50,
C. I. Direct Red 1, ditto 4, ditto 23, ditto 31, ditto 37, ditto 39, ditto 75, ditto 80, ditto 81, ditto 83, ditto 225, ditto 226 and ditto 227, and
C. I. Direct Blue 1, ditto 15, ditto 71, ditto 86, ditto 106 and ditto 119.

Examples of the acid dyes are described below:
C. I. Acid Black 1, ditto 2, ditto 24, ditto 26, ditto 31, ditto 52, ditto 107, ditto 109, ditto 110, ditto 119 and ditto 154,
C. I. Acid Yellow 7, ditto 17, ditto 19, ditto 23, ditto 25, ditto 29, ditto 38, ditto 42, ditto 49, ditto 61, ditto 72, ditto 78, ditto 110, ditto 141, ditto 127, ditto 135 and ditto 142,
C. I. Acid Red 8, ditto 9, ditto 14, ditto 18, ditto 26, ditto 27, ditto 35, ditto 37, ditto 51, ditto 52, ditto 57, ditto 82, ditto 87, ditto 92, ditto 94, ditto 111, ditto 129, ditto 131, ditto 138, ditto 186, ditto 249, ditto 254, ditto 265 and ditto 276,
C. I. Acid Violet 15 and ditto 17,
C. I. Acid Blue 1, ditto 7, ditto 9, ditto 15, ditto 22, ditto 23, ditto 25, ditto 40, ditto 41, ditto 43, ditto 62, ditto 78, ditto 83, ditto 90, ditto 93, ditto 103, ditto 112, ditto 113, and ditto 158, and
C. I. Acid Green 3, ditto 9, ditto 16, ditto 25 and ditto 27.

A large part of the food dyes is included in the direct dyes or the acid dyes, and one example of what are not included therein includes C. I. Food Yellow 3.

Examples of the basic dyes are described below:
C. I. Basic Yellow 1, ditto 2 and ditto 21,
C. I. Basic Orange 2, ditto 14 and ditto 32,
C. I. Basic Red 1, ditto 2, ditto 9 and ditto 14,
C. I. Basic Violet 1, ditto 3 and ditto 7,
C. I. Basic Green 4 and C. I. Basic Brown 12, and
C. I. Basic Black 2 and ditto 8.

These dyes may be used alone or in combination of two or more kinds thereof. The content thereof falls usually in a range of 0.5 to 30% by weight, preferably 1 to 15% by weight based on a whole composition. The content exceeding 30% by weight causes the dye to be deposited to clog at the pen tip when storing over a long period of time, so that inferior writing is brought about. On the other hand, the content of less than 0.5% by weight provides poor coloring and makes it impossible to confirm the hue when writing on paper. Accordingly, both contents are not preferred.

Water-soluble organic solvents which have so far publicly been known may be contained in the dye ink composition of the present invention. The solvents include, for example, water-soluble polyhydric alcohols such as ethylene glycol, propylene glycol and glycerin, cellosolves such as ethylene glycol monomethyl ether (methyl cellosolve) and ethylene glycol monoethyl ether (ethyl cellosolve), carbitols such as diethylene glycol monomethyl ether (methyl carbitol) and diethylene glycol monoethyl ether (ethyl carbitol), and glycol esters such as ethylene glycol monoethyl ether acetate. They improve the non-dry property of the ink.

The blending amount of these water-soluble organic solvents is selected usually in a range of 40% by weight or less, preferably 5 to 40% by weight based on a whole composition. The blending amount exceeding 40% by weight causes strike-through of the ink and makes the ink less dryable. Accordingly, it is not preferred. On the other hand, the blending amount of 5% by weight or less can not improve the non-dry property of the ink.

Water used for the water based ink composition of the present invention shall not specifically be restricted, and the content thereof is preferably 40 to 90% by weight based on a whole composition. The content of less than 40% by weight relatively increases the amounts of a solvent and a colorant and therefore makes the volatilization thereof difficult, so that the ink is less dryable when written on paper. On the other hand, the content exceeding 90% by weight makes the ink more volatile and causes the pen tip to be dried, so that inferior writing is brought about. Accordingly, both contents are not preferred.

In addition to the above, the water based ink composition of the present invention can contain, if necessary, lubricants, preservatives, rust preventives, pH controllers, drying preventives, thickeners and surfactants.

The lubricants include fatty acid salts such as potassium linoleate, sodium ricinoleate, potassium oleate and sodium oleate.

The rust preventives include tolyltriazole, benzotriazole and derivatives thereof, fatty acid phosphorus derivatives such as octyl phosphate and dioctyl thiophosphate, imidazole, benzimidazole and derivatives thereof, 2-mercaptobenzothiazole, octyloxymethanephosphonic acid, dicyclohexyl ammonium.nitrite, diisopropyl ammonium.nitrite, propargyl alcohol, and dialkyl thiourea.

The pH controllers include ammonia, inorganic alkalis, for example, sodium hydroxide, potassium hydroxide, calcium hydroxide, sodium carbonate and sodium hydrogencarbonate. The organic amines include, for example, methylamine, dimethylamine, trimethylamine, ethylamine, diethylamine, triethylamine, propylamine, dipropylamine, tripropylamine, butylamine, dibutylamine, tributylamine, isobutylamine, diisobutylamine, 2-butaneamine, N-(1-methylpropyl)-1-propaneamine, N,N-dimethylbutylamine, 1,2-dimethylpropylamine, N-ethyl-1,2-dimethylpropylamine, allylamine, diallylamine, triallylamine, N,N-dimethylallylamine, N-methylallylamine, 3-pentylamine, N,N-diisopropylethylamine, 2-(hydroxymethylamino)ethanol, 2-aminopropanol, 3-aminopropanol, triethanolamine, monoethanolamine, diethanolamine, 2-amino-2-methyl-1-propanol, N-isobutyldiethanolamine, 3-methoxypropylamine, 3-propyloxypropylamine, 3-isopropyloxypropylamine, and 3-butoxypropylamine.

The drying preventives include urea, thiourea, ethyleneurea and derivatives thereof.

The preservatives include phenol, isopropylmethylphenol, sodium pentachlorophenol, benzoic acid, sodium benzoate, dehydroacetic acid, sodium dehydroacetate, sorbic acid, potassium sorbate, 2--pyridinethiol-l-oxide sodium salt, 1,2-benzisothiazoline-3-one, 5-chloro-2-methyl-4-isothiazoline-3-one, 2,4-thiazolylbenzimidazole and paraoxybenzoic esters.

The thickeners include gum arabic, tragacanth gum, locust bean gum, guar gum and derivatives thereof, alginic acid, alginates, pectin, carrageenan, gelatin, casein, sodium casein, xanthane gum, rhamsan gum, welan gum, gellan gum, dextran, methyl cellulose, ethyl cellulose, hydroxyethyl cellulose, carboxymethyl cellulose, hydroxypropyl cellulose, lanolin derivatives, chitosan derivatives, lactalbumin, polyethylene oxide, polyethylene glycol, polyvinyl alcohol, polyvinyl methyl ether, polyvinylpyrrolidone and derivatives thereof, polyacrylic acid resins, polyurethane resins and alkali metal salts of acrylic resin.

The dye ink composition for a free ink rollerball pen according to the present invention has the constitution and the composition described above. In particular, an emulsion or a latex of such white resin particles as described above is contained in the dye ink composition, whereby the visible color of a dye ink liquid can come close to the visible color of lines in writing on a sheet of white paper to such an extent that they are almost consistent with each other.

The embodiment of the present invention shall be explained below.

The water based dye ink composition for a free ink rollerball pen according to the present invention is prepared by adding the white resin particles to a dye ink composition comprising a dye and an aqueous medium. A production process thereof may be the same as conventional methods and shall not specifically be restricted. That is, the white resin particles may be blended later into the dye ink composition comprising the dye and the aqueous medium, which has been prepared in advance, or the white resin particles may be blended together with the dye and the aqueous medium to prepare the dye ink composition. It shall not specifically be restricted. In this case, the mixture is stirred for prescribed time at a blending temperature falling in a range of room temperature to 60° C. and then suitably cooled down, followed by filtration, whereby the dye ink composition can be obtained.

The water based ink for a free ink rollerball pen according to the present invention has preferably a surface tension of 37.0 (mN/m) or more in order to prevent blobbing from the pen tip. The surface tension is controlled by selecting an amount and a kind of the lubricant and the surfactant to be used.

When the water based ink composition for a free ink rollerball pen according to the present invention is used for a free ink rollerball pen, there are two kinds of free ink rollerball pens; one is composed of an ink tank in which the water based ink composition of the present invention described above is directly reserved, an ink holder in which the ink pushed out of the ink tank when air in the ink tank is expanded by an elevation in the temperature is temporarily held in order to prevent blobbing of the ink from the pen tip and the blow hole, and a pen tip part comprising a ball and a tip holder; and the other is composed of a tube in which the ink of the present invention described above is directly reserved and a pen tip part comprising a ball and a tip holder.

The viscosity of the water based ink composition of the present invention includes 1 to several mPa·s or 50 to 2000 mPa·s. The ink having an ink viscosity of 1 to several mPa·s is used for a free ink rollerball pen having an ink tank in which the ink described above is directly reserved. On the other hand, the ink having an ink viscosity of 50 to 2000 mPa·s is used for a ballpoint pen having a structure in which the aforementioned tube for the direct reserving of the ink is mainly used as an ink reservoir. The tip holder used for the ballpoint pen to be filled with water based ink is equipped usually with a pen tip which is made of a material selected from stainless steel, brass and nickel silver and has a ball made of hard metal, zirconia or silicon carbide.

The water based ink composition for a free ink rollerball pen according to the present invention is allowed to contain an emulsion (latex) of the white resin particles as described above, whereby the visible color of the dye ink liquid when the ink is directly reserved in the ink tank or the ink tube of the free ink rollerball pen can almost be consistent with the visible color of the lines in writing on a sheet of white paper. This makes it possible to confirm the visible color of the drawn lines in writing on a sheet of white paper from the visible color of the ink liquid, and therefore the pen body becomes excellent in terms of appearance or design.

EXAMPLES

Next, the present invention shall specifically be explained with reference to examples, but the present invention shall by no means be restricted by these examples.

The colors of the ink liquids obtained in the following examples/comparative examples and the colors of the lines written on a sheet of white paper (PPC paper) were measured by means of a color computer [multiple light source spectrocolorimeter (Suga Tester Co., Ltd.) MSC-IS-2D]. In this case, the following L, C and H values based on L, a and b (JIS Z 8729) were used for a color specification system.
L: lightness, C: saturation, H: hue angle
$C=[(a)^2+(b)^2]^{1/2}$
$H=\tan^{-1}(b/a)$ The average particle diameters of the resins were determined by a photon correlation method (Coulter Co., Ltd.: coulter N4)

The refractive indices were measured by means of a microscope and an Abbe refractometer based on method of measuring refractive index of powder of JIS.

Comparative Example 1

The following components were stirred in the following blend ratio at room temperature for one hour and then filtered to obtain a water based red dye ink for ballpoint pen. The measurements of the respective L, C and H values of this dye ink liquid and the line written on a sheet of white paper (PPC paper) by means of a free ink rollerball pen in which the ink is reserved directly in a tube are shown in Table 1.

| Red No. 104 (acid dye) | 5.0% by weight |
| --- | --- |
| Ethylene glycol (solvent) | 15.0 |
| Triethanolamine (pH controller) | 0.5 |
| Benzotriazole (rust preventive) | 0.3 |
| 1,2-Benzisothiazoline-3-one (preservative) | 0.1 |
| Xanthane gum (thickener) | 0.3 |
| Purified water | 78.8 |
| Total | 100.0 |

Example 1

A red water based dye ink for a ballpoint pen was obtained in the same manner as in Comparative Example 1, except that a white resin particle emulsion C-10 (manufactured by Showa Kobunshi Co., Ltd.: polystyrene emulsion; refractive index of resin: 1.59, average particle diameter: 120 nm, Tg: 100° C., no film-forming property) was added in a ratio of 10% by weight in terms of a concentration reduced to a solid content basis in blending the respective components shown in Comparative Example 1 described above. The measurements of the respective L, C and H values of this dye ink liquid and the line written on a sheet of white paper (PPC paper) are shown in Table 1.

Comparative Example 2

A red water based dye ink for a ballpoint pen was obtained in the same manner as in Example 1, except that Primal B-85 (manufactured by Rohm & Haas Co., Ltd.: acryl emulsion; average particle diameter: 71 nm, Tg: 90° C.) was substituted for the white resin particle emulsion (C-10) used in Example 1 described above. The measurements of the respective L, C and H values of this dye ink liquid and the line written on a sheet of white paper (PPC paper) are shown in Table 1.

Comparative Example 3

The following components were stirred in the following blend ratio at room temperature for one hour and then filtered to obtain a blue water based dye ink for a ballpoint pen. The measurements of the respective L, C and H values of this dye ink liquid and the line written on a sheet of white paper (PPC paper) by means of a free ink rollerball pen in which the ink is reserved directly in a tube are shown in Table 1.

| Red No. 1 (acid dye) | 2.0% by weight |
| --- | --- |
| Glycerin (solvent) | 20.0 |
| Triethanolamine (pH controller) | 0.5 |
| 2-Mercaptobenzothiazole (rust preventive) | 0.1 |
| 2-Pyridiol-1-oxide sodium salt (preservative) | 0.1 |
| Potassium oleate (lubricant) | 0.5 |
| Purified water | 76.8 |
| Total | 100.0 |

Example 2

A blue water based dye ink for a ballpoint pen was obtained in the same manner as in Comparative Example 3, except that a white resin particle emulsion YJ1120D (manufactured by Mitsubishi Chemical BASF Co., Ltd.: styrene•alkyl methacrylate•alkyl acrylate copolymer resin; refractive index of resin: 1.60, average particle diameter: 150 nm, MFT (minimum film-forming temperature: 58° C.) was added in a ratio of 10% by weight in terms of a concentration reduced to a solid content basis in blending the respective components shown in Comparative Example 3 described above. The measurements of the respective L, C and H values of this dye ink liquid and the line written on a sheet of white paper (PPC paper) are shown in Table 1.

Comparative Example 4

The following components were stirred in the following blend ratio at room temperature for one hour and then filtered to obtain a yellow water based dye ink for a ballpoint pen. The measurements of the respective L, C and H values of this dye ink liquid and the line written on a sheet of white paper (PPC paper) by means of a free ink rollerball pen in which the ink is reserved go directly in a tube are shown in Table 1.

| | |
|---|---|
| Yellow No. 4 (acid dye) | 5.0% by weight |
| Propylene glycol (solvent) | 25.0 |
| 2-Amino-2-methyl-1-propanol (pH controller) | 0.2 |
| Tolyltriazole (rust preventive) | 0.1 |
| Phenol (preservative) | 0.1 |
| Purified water | 69.6 |
| Total | 100.0 |

Example 3

A yellow water based dye ink for a ballpoint pen was obtained in the same manner as in Comparative Example 4, except that a white resin particle emulsion LX303 (manufactured by Nippon Zeon Co., Ltd.: polystyrene; refractive index of resin: 1.60, average particle diameter: 160 nm, Tg: 100° C.) was added in a ratio of 10% by weight in terms of a concentration reduced to a solid content basis in blending the respective components shown in Comparative Example 4 described above. The measurements of the respective L, C and H values of this dye ink liquid and the line written on a sheet of white paper (PPC paper) are shown in Table 1.

TABLE 1

| Ink example | Condition | L value | C value | H value |
|---|---|---|---|---|
| Comparative Example 1 | Liquid | 6.7 | 2.5 | 67.0 |
| | Paper surface | 54.8 | 55.5 | 5.3 |
| Example 1 | Liquid | 40.3 | 69.3 | 17.8 |
| | Paper surface | 52.4 | 66.1 | 10.5 |
| Comparative Example 2 | Liquid | 17.6 | 32.5 | 16.2 |
| | Paper surface | 44.4 | 72.0 | 8.9 |
| Comparative Example 3 | Liquid | 6.8 | 0.5 | 114.1 |
| | Paper surface | 40.4 | 35.6 | 256.7 |
| Example 2 | Liquid | 22.8 | 33.4 | 261.2 |
| | Paper surface | 35.8 | 38.2 | 247.9 |
| Comparative Example 4 | Liquid | 9.4 | 7.7 | 41.8 |
| | Paper surface | 79.5 | 69.8 | 85.4 |
| Example 3 | Liquid | 71.4 | 103.0 | 75.3 |
| | Paper surface | 78.3 | 91.9 | 86.5 |

As apparent from the respective measurements described above, the measured color values in the ink liquids are far low in the comparative examples as compared with those of the lines written on a sheet of white paper, and both visible colors are not consistent. In contrast with this, in the ink compositions of the present invention, the measured color values in the ink liquids are close to those of the lines written on a sheet of white paper, and it has been confirmed as well from an actual writing test that the visible colors in the ink liquids are almost consistent with the colors of the lines written on a sheet of white paper.

What is claimed is:

1. A water based dye ink composition for a free ink rollerball pen characterized in that white resin particles which are insoluble in an aqueous medium and have an average particle diameter of 100 to 1000 nm and a refractive index of 1.50 or more at 20° C. are added to a water based ink composition for a writing instrument comprising a water-soluble dye and an aqueous medium, wherein the water based dye ink composition has a surface tension of 37 mN/m or more and the visible color of the ink liquid is consistent with the visible color of lines written on a sheet of white paper.

2. The water based dye ink composition for a free ink rollerball pen as described in claim 1, wherein the white resin particles are of a water-dispersing resin comprising an emulsion or a latex which has no film-forming property or has an MFT (minimum film-forming temperature) of 50° C. or higher.

3. The water based dye ink composition for a free ink rollerball pen as described in claim 1, wherein the white resin particles are contained in the ink composition in a proportion of 5 to 70 wt % in terms of a concentration reduced to a solid content basis.

4. The water based dye ink composition for a free ink rollerball pen as described in claim 1, wherein the white resin particles are of a water-dispersing resin comprising an emulsion or a latex which has no film-forming property.

* * * * *